(12) United States Patent
Bankoski et al.

(10) Patent No.: US 8,891,627 B1
(45) Date of Patent: Nov. 18, 2014

(54) SYSTEM AND METHOD FOR CODING VIDEO USING COLOR SEGMENTATION

(75) Inventors: James Bankoski, Mountain View, CA (US); Paul Wilkins, Cambridge (GB); Yaowu Xu, San Diego, CA (US)

(73) Assignee: Google Inc., Mountain View, CA (US)

( * ) Notice: Subject to any disclaimer, the term of this patent is extended or adjusted under 35 U.S.C. 154(b) by 725 days.

(21) Appl. No.: 13/088,615

(22) Filed: Apr. 18, 2011

(51) Int. Cl.
| | | |
|---|---|---|
| *H04N 1/40* | (2006.01) | |
| *H04N 19/119* | (2014.01) | |
| *H04N 19/139* | (2014.01) | |
| *H04N 19/137* | (2014.01) | |
| *H04N 1/60* | (2006.01) | |
| *H04N 19/51* | (2014.01) | |
| *H04N 19/507* | (2014.01) | |

(52) U.S. Cl.
CPC ..... *H04N 19/00072* (2013.01); *H04N 1/40062* (2013.01); *H04N 1/60* (2013.01); *H04N 19/00715* (2013.01); *H04N 19/00684* (2013.01); *H04N 19/00581* (2013.01); *H04N 19/00151* (2013.01); *H04N 19/00587* (2013.01); *H04N 19/00145* (2013.01)
USPC ............. 375/240.16; 375/240.12; 375/240.24

(58) Field of Classification Search
None
See application file for complete search history.

(56) References Cited

U.S. PATENT DOCUMENTS

| | | | |
|---|---|---|---|
| 5,751,846 A | 5/1998 | Higgins-Luthman | |
| 5,777,680 A | 7/1998 | Kim | |
| 6,035,059 A | 3/2000 | Kurosawa | |
| 6,337,917 B1 * | 1/2002 | Onural et al. | 382/107 |
| 6,757,434 B2 | 6/2004 | Miled et al. | |
| 6,944,226 B1 | 9/2005 | Lin | |
| 8,155,454 B2 | 4/2012 | Raveendran | |
| 8,243,797 B2 | 8/2012 | Lin et al. | |
| 2001/0041015 A1 | 11/2001 | Chui | |
| 2002/0012471 A1 | 1/2002 | Nayyar | |
| 2003/0039307 A1 | 2/2003 | Prakash | |
| 2004/0120398 A1 | 6/2004 | Zhang et al. | |
| 2004/0252886 A1 * | 12/2004 | Pan et al. | 382/173 |
| 2005/0046702 A1 | 3/2005 | Katayama et al. | |
| 2005/0152456 A1 * | 7/2005 | Orchard et al. | 375/240.24 |
| 2005/0206785 A1 | 9/2005 | Swan et al. | |
| 2007/0025444 A1 | 2/2007 | Okada | |
| 2007/0076947 A1 | 4/2007 | Wang et al. | |
| 2007/0110290 A1 | 5/2007 | Chang et al. | |
| 2007/0140346 A1 * | 6/2007 | Chen et al. | 375/240.16 |
| 2008/0063069 A1 | 3/2008 | Sekiguchi | |

(Continued)

OTHER PUBLICATIONS

M. Bierling, Displacement estimation by hierarchical blockmatching, 1998, in Proceedings of Spie Visual Communications and Image Processing 88, p. 942-951.*

(Continued)

*Primary Examiner* — Chikaodili E Anyikire
*Assistant Examiner* — Edemio Navas, Jr.
(74) *Attorney, Agent, or Firm* — Young Basile Hanlon & MacFarlane P.C.

(57) ABSTRACT

Disclosed herein is method for encoding a video signal having at least one frame with a plurality of blocks having pixels. The method includes identifying a first color of pixels in a block in the at least one frame, assigning pixels in the block having the first color to a first source segment and assigning pixels in the block having a color different than the first color to a second source segment and determining a set of motion vectors derived from first source segment and a set of motion vectors derived from the second source segment.

7 Claims, 8 Drawing Sheets

(56) References Cited

U.S. PATENT DOCUMENTS

| | | | |
|---|---|---|---|
| 2008/0159408 | A1 | 7/2008 | Degtyarenko |
| 2008/0199091 | A1 | 8/2008 | Srinivasan |
| 2008/0246884 | A1* | 10/2008 | Chung .................... 348/699 |
| 2009/0161938 | A1 | 6/2009 | Shekhar et al. |
| 2009/0262835 | A1* | 10/2009 | Srinivasan et al. ....... 375/240.16 |
| 2009/0296814 | A1* | 12/2009 | Lin et al. ................. 375/240.16 |
| 2009/0304255 | A1 | 12/2009 | Hagiwara |
| 2009/0322937 | A1 | 12/2009 | Young |
| 2010/0061444 | A1 | 3/2010 | Wilkins et al. |
| 2010/0272173 | A1 | 10/2010 | Puri et al. |
| 2011/0188579 | A1* | 8/2011 | Lin et al. ................. 375/240.16 |
| 2012/0027083 | A1 | 2/2012 | Narroschke |
| 2013/0195177 | A1 | 8/2013 | Hong |

OTHER PUBLICATIONS

"Series H: Audiovisual and Multimedia Systems; Infrastructure of audiovisual services—Coding of moving video; Advanced video coding for generic audiovisual services", H.264. Version 1. International Telecommunication Union. Dated May 2003.

"Series H: Audiovisual and Multimedia Systems; Infrastructure of audiovisual services—Coding of moving video; Advanced video coding for generic audiovisual services", H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union dated Jun. 2006.

"VP6 Bitstream & decoder specification", Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & decoder specification", Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

Pascal Fleury et al: "MPEG-4 video verification model: A solution for interactive multimedia applications" Journal of Electronic Imaging, SPIE/IS&T; Engineering Information Inc.; vol. 7, Jul. 1, 1998, pp. 502-515.

\* cited by examiner

SYSTEM AND METHOD FOR CODING VIDEO USING COLOR SEGMENTATION

TECHNICAL FIELD

The present invention relates in general to video encoding and decoding.

BACKGROUND

An increasing number of applications today make use of digital video for various purposes including, for example, remote business meetings via video conferencing, high definition video entertainment, video advertisements, and sharing of user-generated videos. As technology is evolving, users have higher expectations for video quality and expect high resolution video even when transmitted over communications channels having limited bandwidth.

To permit higher quality transmission of video while limiting bandwidth consumption, a number of video compression schemes are noted including formats such as VPx, promulgated by Google Inc. of Mountain View, Calif., and H.264, a standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10).

These compression schemes may use different techniques to achieve compression. For example, many of these schemes use prediction techniques that predict where information contained in a portion of a first frame or first region of a frame can be found in a second frame or second region of the frame. The difference between the prediction and the portion of data in the second frame or second frame region is calculated to form a residual. One type of prediction, known as intra prediction, can be based on previously coded image samples within the current frame. Another type of prediction known as inter prediction can be based on previously coded frames ("reference frames"). One inter prediction technique, for example, can utilize block-based motion estimation and compensation. Motion estimation can involve searching for a sample region in a reference frame that, for example, closely matches a current block in a current frame. The luma and chroma samples of the matching sample region are subtracted from the current block to produce a residual that is encoded. A motion vector is also encoded that describes the position of the matching sample region relative to the position of the current block.

SUMMARY

Embodiments of an apparatus and a method for encoding and decoding a video signal having a plurality of frames with at least one frame with a plurality of blocks having pixels are disclosed herein. In one embodiment, the method includes encoding a video signal by identifying a first color of pixels. The method also includes assigning pixels in a source block having the first color to a first source segment and assigning pixels in the source block having a color different than the first color to a second source segment. The method also includes determining a set of motion vectors derived from the first source segment and a set of motion vectors derived from the second source segment.

In another embodiment, the apparatus includes encoding a video signal using a memory and a processor. The processor is configured to execute instructions stored in the memory to (1) identify a first color of pixels, (2) assign pixels in a source block having the first color to a first source segment and assigning pixels in the source block having a color different than the first color to a second source segment, (3) determine a set of motion vectors derived from at least one of the first and second segments, and (4) encode the source block using one of the determined set of motion vectors.

In another embodiment, the method includes decoding an encoded video signal by (1) extracting parameters from the encoded video signal, the parameters comprising a residual block, a color segment map, a set of motion vectors, and a segment flag, and (2) reconstructing a block using the residual block, the color segment map, the set of motion vectors, and the segment flag.

These and other embodiments will be described in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
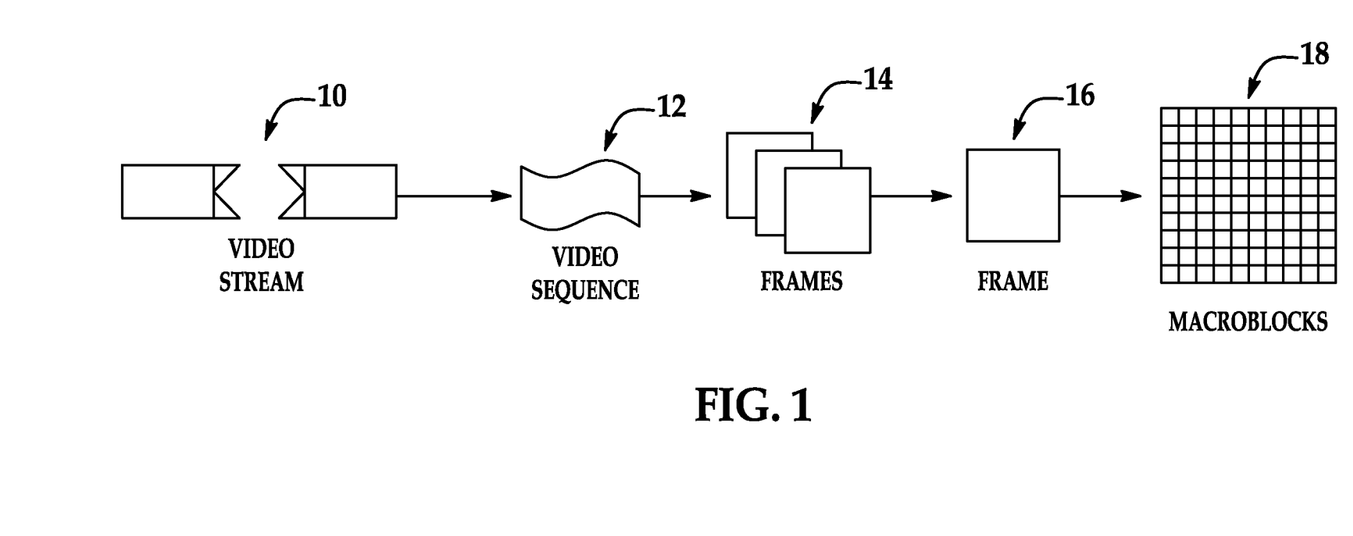
FIG. 1 is a diagram of a video stream.

FIG. 1 is a diagram of a video stream 10 to be encoded and decoded. Video coding formats, such as VP8 or H.264, provide a defined hierarchy of layers for video stream 10. Video stream 10 includes a video sequence 12. At the next level, video sequence 12 consists of a number of adjacent frames 14, which can be further subdivided into a frame 16. At the next level, frame 16 can be divided into a series of macroblocks 18, which contain data corresponding to, for example, a 16×16 block of displayed pixels. Each of macroblocks 18 can contain luminance and chrominance data for the corresponding pixels. Macroblocks 18 can also be of any other suitable size such as 16×8 pixel groups or 8×16 pixel groups.

Figure 2:
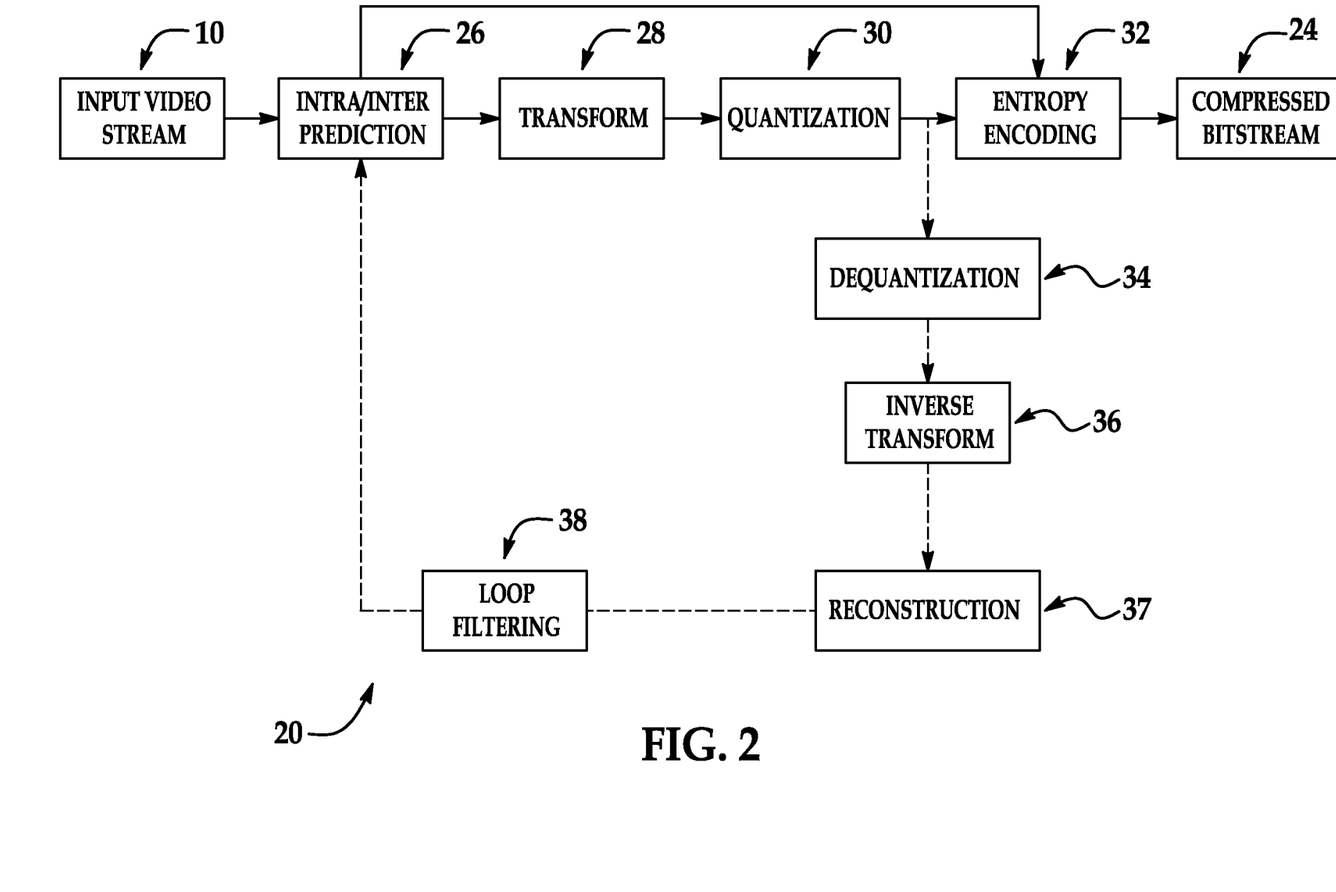
FIG. 2 is a block diagram of a video compression system in accordance with one embodiment.

FIG. 2 is a block diagram of a video compression system in accordance with one embodiment. An encoder 20 encodes an video stream 10. Encoder 20 preferably has the following stages to perform the various functions in a forward path (shown by the solid connection lines) to produce an encoded or compressed bitstream 24: intra/inter prediction stage 26, transform stage 28, quantization stage 30 and entropy encoding stage 32. Encoder 20 also includes a reconstruction path (shown by the dotted connection lines) to reconstruct a frame for encoding of further macroblocks. Encoder 20 preferably has the following stages to perform the various functions in the reconstruction path: dequantization stage 34, inverse transform stage 36, reconstruction stage 37 and loop filter stage 38.

When video stream 10 is presented for encoding, each frame 16 within video stream 10 is processed in units of macroblocks. At intra/inter prediction stage 26, each macroblock can be encoded using either intra prediction or inter prediction. In either case, a prediction macroblock can be formed. In the case of intra-prediction, a prediction macroblock can be formed from samples in the current frame that have been previously encoded and reconstructed. In the case of inter-prediction, a prediction macroblock can be formed from samples in one or more previously constructed reference frames as described in additional detail herein.

Next, still referring to FIG. 2, the prediction macroblock can be subtracted from the current macroblock at stage 26 to produce a residual macroblock (residual). Transform stage 28 transforms the residual into transform coefficients, and quantization stage 30 quantizes the transform coefficients to provide a set of quantized transform coefficients. The quantized transform coefficients are then entropy encoded by entropy encoding stage 32. The entropy-encoded coefficients, together with the information required to decode the macroblock, such as the type of prediction used, motion vectors and quantizer value, are then output to compressed bitstream 24.

The reconstruction path in FIG. 2 is present to ensure that both the encoder and the decoder use the same reference frames to decode the macroblocks. The reconstruction path performs functions that are similar to functions that take place during the decoding process that are discussed in more detail below, including dequantizing the transform coefficients at a dequantization stage 34 and inverse transforming the dequantized transform coefficients at an inverse transform stage 36 in order to produce a derivative residual macroblock (derivative residual). At reconstruction stage 37, the prediction macroblock that was predicted at prediction stage 26 can be added to the derivative residual to create a reconstructed macroblock. A loop filter stage 38 can then be applied to the reconstructed macroblock to reduce blocking distortion.

Other variations of encoder 20 can be used to encode bitstream 24. For example, a non-transform based encoder can quantize the residual signal directly without transform stage 28. In another embodiment, an encoder may have quantization stage 30 and dequantization stage 34 combined into a single stage.

Figure 3:
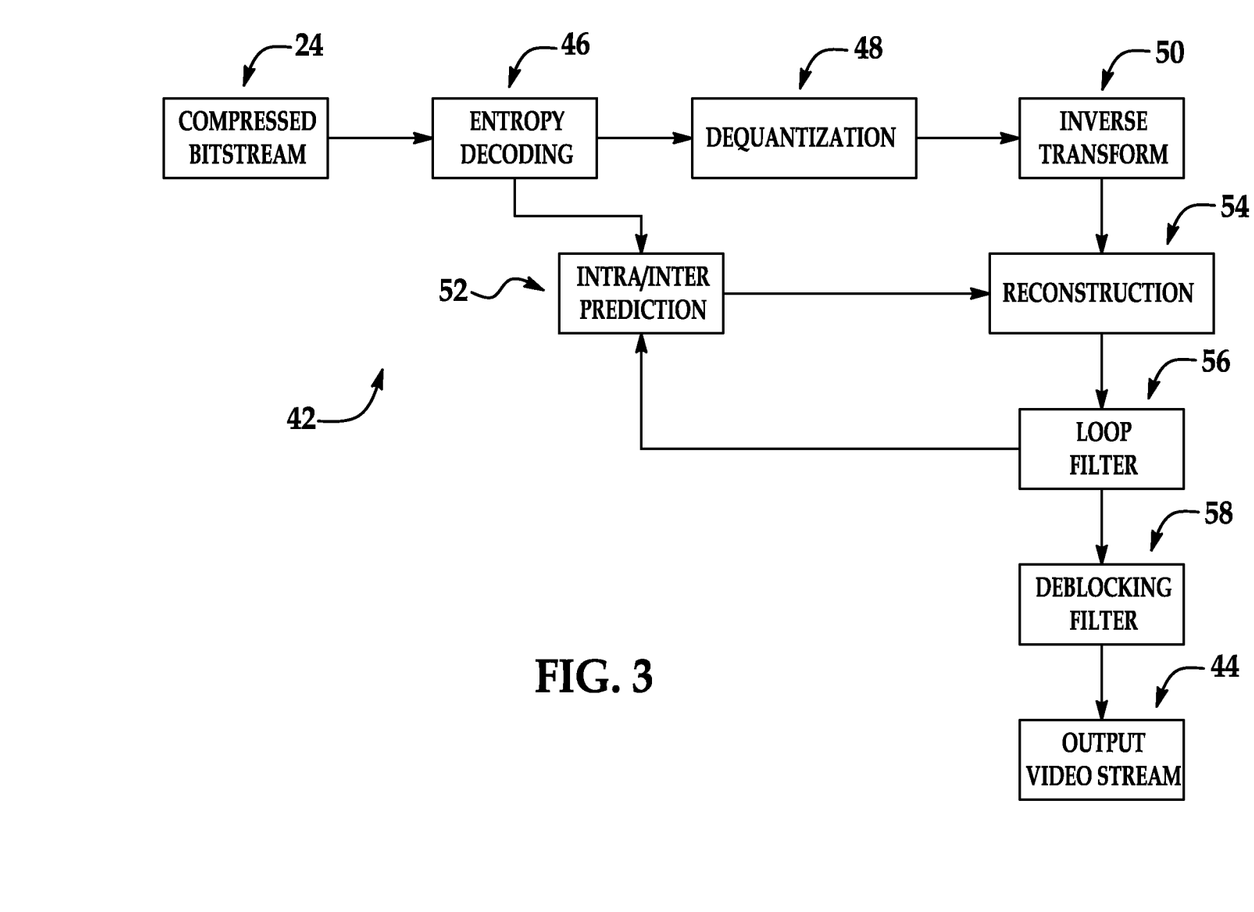
FIG. 3 is a block diagram of a video decompression system in accordance with another embodiment.

FIG. 3 is a block diagram of a video decompression system or decoder 42 to decode compressed bitstream 24. Decoder 42 similar to the reconstruction path of the encoder 20 discussed previously, preferably includes the following stages to perform various functions to produce an output video stream 44 from compressed bitstream 24: entropy decoding stage 46, dequantization stage 48, inverse transform stage 50, intra/inter prediction stage 52, reconstruction stage 54, loop filter stage 56 and deblocking filter stage 58. Other structural variations of decoder 42 can be used to decode compressed bitstream 24.

When compressed bitstream 24 is presented for decoding, the data elements within compressed bitstream 24 can be entropy decoded by entropy decoding stage 46 (using, for example, Context Adaptive Binary Arithmetic Decoding) to produce a set of quantized transform coefficients. Dequantization stage 48 dequantizes the transform coefficients, and inverse transform stage 50 inverse transforms the dequantized transform coefficients to produce a derivative residual that can be identical to that created by the reconstruction stage in the encoder 20. Using header information decoded from the compressed bitstream 24, decoder 42 can use intra/inter prediction stage 52 to create the same prediction macroblock as was created in encoder 20. At reconstruction stage 54, the prediction macroblock can be added to the derivative residual to create a reconstructed macroblock. Loop filter stage 56 can be applied to the reconstructed macroblock to further reduce blocking artifacts. Deblocking filter stage 58 can be applied to the reconstructed macroblock to reduce blocking distortion, and the result is output as output video stream 44.

Other structural variations of decoder 42 can be used to decode compressed bitstream 24. For example, a decoder may produce output video stream 44 without deblocking filter stage 58.

A basic description of the treatment of color in video systems is useful in explaining aspects and embodiments of the invention. The original colors in an image (generally represented in RGB format) can be stored for each pixel as a signal including, for example, separate luma Y' and chrominance C values. Each luma value Y' can be a weighted sum of gamma-compressed red, green and blue components (R'G'B'). Collectively, the luma values Y' can represent the achromatic portion of an image (that is, the image without color). Each chrominance value C of a pixel can comprise two chrominance (or chroma) components Cb and Cr that are equal to B'−Y' and R'−Y' respectively and are sometimes called color difference components. Chroma components Cb and Cr are sometimes shown as $C_B$ and $C_R$. Encoder 20 can perform this conversion from the RGB colorspace to luma Y' and chrominance C values based on input from video stream 10, but encoder 20 can receive an already-converted video stream 10. While this discussion uses the references Y' for luma and Cb and Cr for the chrominance components, it is common to also see the reference Y for luma and U and V for the chrominance components. Here, the actual color format is not critical or limited and can be any color format or colorspace.

Figure 4:
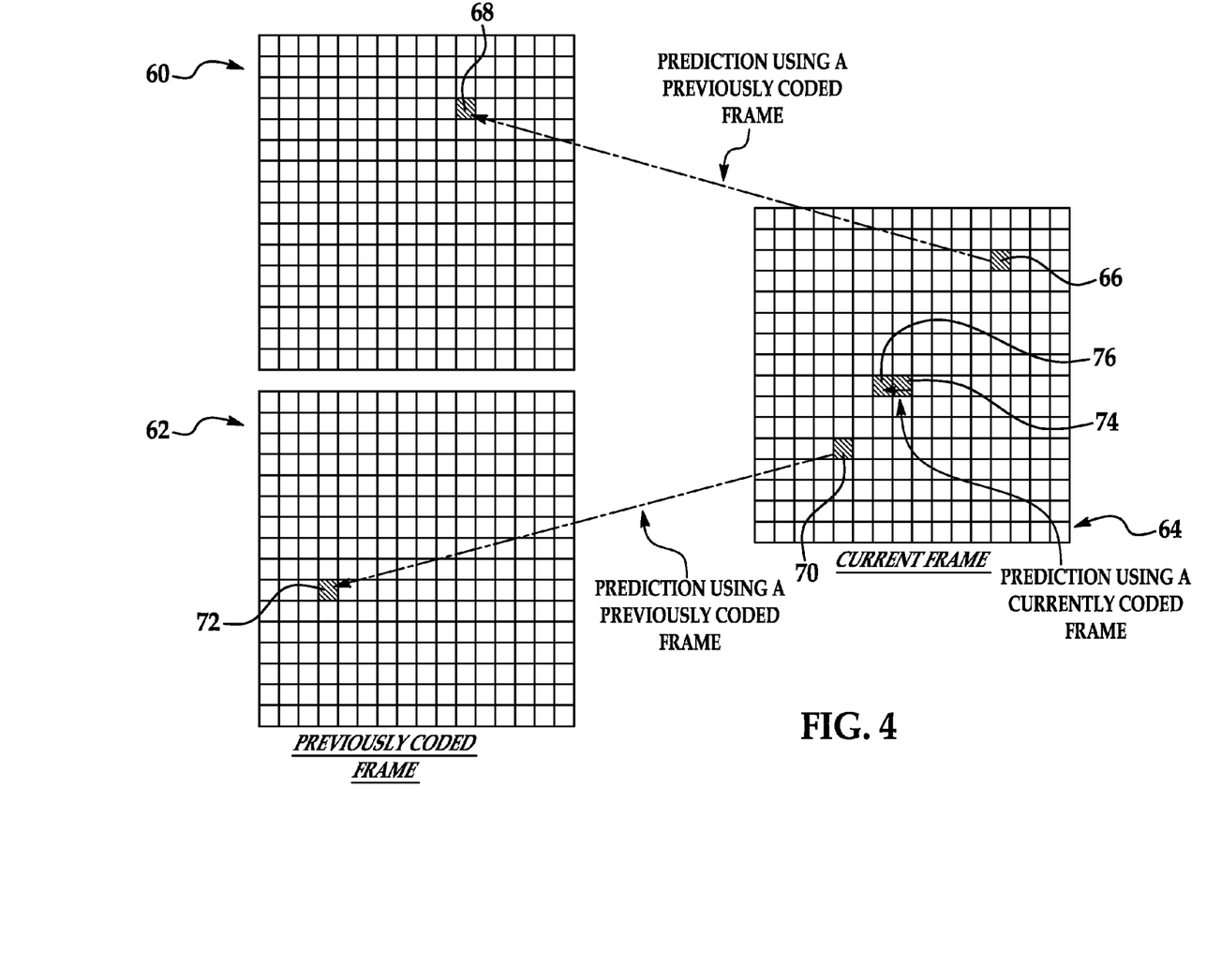
FIG. 4 is a schematic diagram of intra-prediction and inter-prediction modes used in the video compression and decompression systems of FIGS. 2 and 3.

FIG. 4 is a schematic diagram of intra prediction and inter prediction. As illustrated, FIG. 4 shows reference frames 60, 62 and a current frame 64 that is currently being encoded or decoded. As discussed previously, each frame can be processed in units of macroblocks at intra/inter prediction stage 26 or intra/inter prediction stage 52 and each macroblock can be coded using either intra prediction, inter prediction or some combination of inter prediction and intra prediction. For example, a current block 66 is shown being encoded or decoded using inter prediction from a macroblock 68 from previously coded reference frame 60. Similarly, a current block 70 is shown being encoded or decoded using inter prediction from a macroblock 72 from previously encoded reference frame 62. Also, for example, a current macroblock 74 is shown being encoded or decoded using intra prediction from a macroblock 76 within current frame 64.

Hereafter, the embodiments will be described using the term "blocks" which includes macroblocks as described previously. Blocks, like macroblocks, can be of any suitable size.

Inter prediction can utilize block-based motion estimation to compensate for movement of blocks each having, for example, M×N samples (e.g. 16×16) in the current frame. To predict the position of a current block (e.g. current block 70) in a current frame (e.g., frame 64), an area can be searched in a reference frame (e.g., reference frame 62) to find a best-matching block. The searched area or search window can be a region in the reference frame that is centered about the same coordinates as the current block in the current frame that is extended by a maximum displacement R. As such, the search window can have an area of (2R+M)×(2R+N). Block-based motion estimation is the process of using a search scheme to find the best-matching block in the search window on the basis of a matching criterion. In some instances, the matching criterion is a measure of error between a block in the search window and the current block, and the best matching block is a block in the search window that has the lowest measure of error. For example, the measure of error can be the mean squared error, mean absolute difference or, normalized cross-correlation function between the current block and the search window block. Other matching criteria are also possible.

The displacement between the current block and the best-matching block is saved as a motion vector for the current block. Subsequently, the best-matching block (i.e. the predictor) is subtracted from the current block to form a residual block. As discussed previously, both the residual block and the motion vector can be further processed and compressed (e.g., through transformation, quantization, and entropy encoding).

Figure 5:
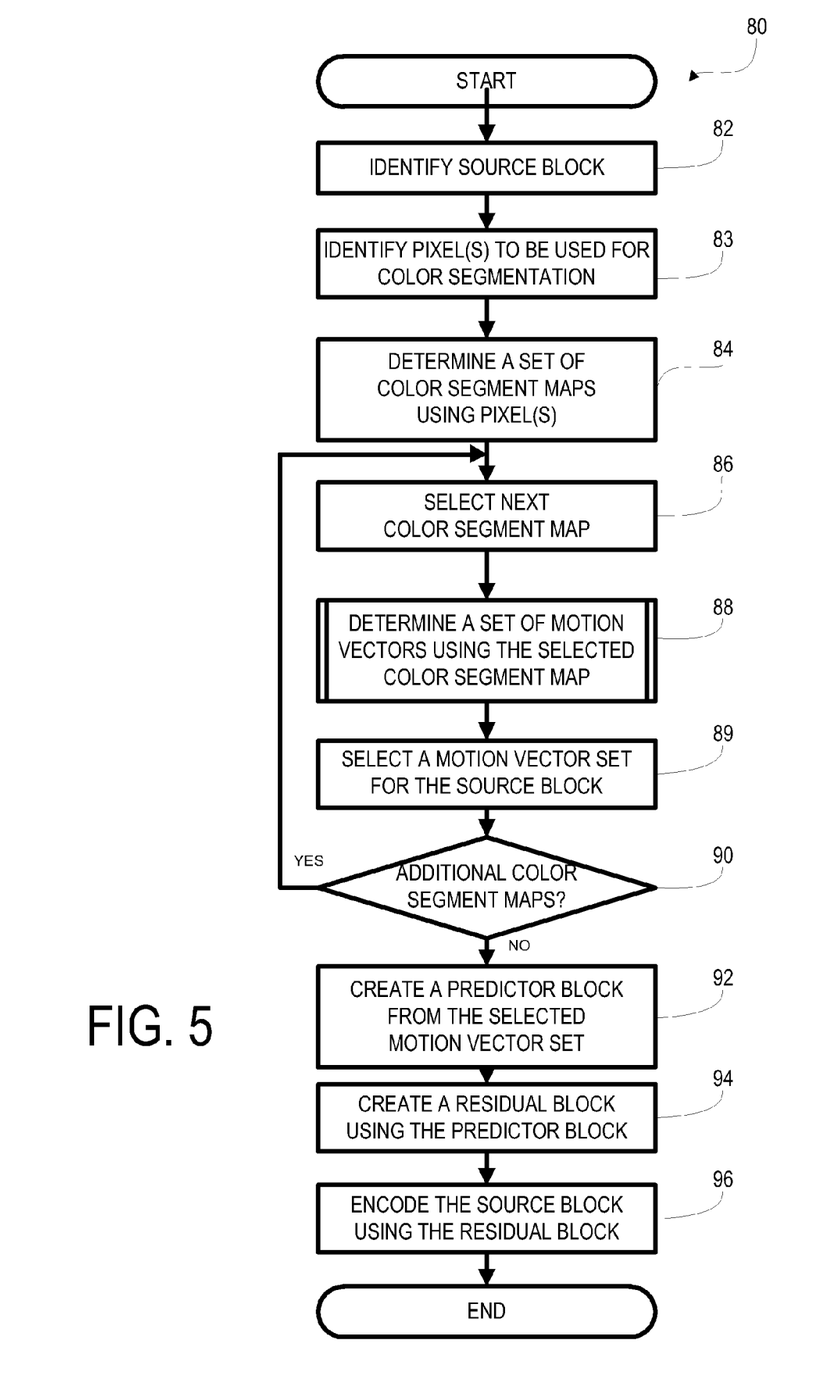
FIG. 5 is a flowchart diagram of a method of encoding a block using color segmentation in the video compression system of FIG. 2.

FIG. 5 is a flowchart diagram of a method 80 of encoding a block using color segmentation by encoder 20. First, a source block to be encoded is identified (82). One or more pixels are then identified to be used for color segmentation (83). Each color segmentation can be defined by one or more pixels. These pixels can be, for example, the pixels at the four corners of the block. Or, the selected pixel(s) can be, for example, the pixels the pixel at the center of the block. Alternately, any other pattern of one or more pixels may be identified in the block. In addition to the pixel(s) identified from the block, one or more pixels previously used to create a set of motion vectors (for a previously encoded block) by method 80 may be selected. The previously used pixel will be one whose resulting set of motion vectors was used to encode the previously encoded block.

In one embodiment a color will include color value(s) of the one or more identified pixels. A color can also include color values within one or more threshold values from at least one of the color value(s). The color value(s) may be, for example, the Y, U, and V components of a pixel. Alternatively other color representation schemes may be used. Threshold value(s) for each of the Y, U, and V components may be the same or different and may be selected by the encoder or may be constants that are pre-configured into the encoder. In other embodiments, less than all of the components may be considered (e.g. only the Y component). An exemplary threshold value that may be used is 20. For example, with a Y color value of 50 and a threshold value of 20, any Y color value between 30 and 70 would be included in the color segementation.

Once the pixel(s) are identified, a set of color segment maps are created using the pixel(s) (84). A color segment map defines the color of the color segmentation that it represents. In one embodiment, a color segment map may simply be a color as defined above. For example, a color segment map may indicate a segmentation based upon the color red. But a color segment map can represent more complex colors. For example, a color segment map can indicate a segmentation based on a set of colors (i.e. black color values and white color values).

The example described above is only one embodiment of identifying color of pixels to define color segment maps for segmentation. A color of pixels may be defined in other ways. For example, a color of pixels may be a single YUV or RGB color value and can also include a threshold. Alternatively, a color of pixels may be a set of color values, for example, white and black. In a set of color values, each color value in the set may also have a threshold value. In this example, white and black may include colors that are almost white or almost black.

Once the color segment maps are determined, the first color segment map is selected (86). A set of motion vectors using the selected color segment map is determined (88). A method of determining the set of motion vectors is described later with respect to FIG. 6. Then, the set of motion vectors is examined to determine whether to select it as the motion vector set for the source block (89). If the current motion vector set is the first motion vector set to be determined, then it will automatically be selected. However, if there is already a selected motion vector set for the source block, the current motion vector set will be compared against the previously selected motion vector set.

The comparison can be based on a segmentation error of each set. The segmentation error may be calculated using the sum of absolute differences (SAD). The segmentation error may be alternatively be calculated using other methods, including but not limited to: the sum of absolute transformed differences (SATD) or the sum of squared differences (SSD). The segmentation error may be the same as or different from the errors calculated during the motion vector search. The motion vector set is selected using the segmentation errors. The selected motion vector set may be, for example, the motion vector set having the segmentation error with the smallest value.

Next, the encoder determines whether there are additional color segment maps to process (90). If there are, control returns to stage 86 to select the next color segment map. However, if not, a predictor block is created using the selected motion vector set for the source block (92). The process for creating the predictor block is described in more detail later with respect to FIG. 7. The encoder then creates a residual block using the predictor block (94). And the source block is encoded using the residual block (96). When encoding, the encoder will include certain parameters with the encoded source block to enable the decoder to decode the encoded source block. These parameters include the color segment map used to create the selected set of motion vectors, the selected set of motion vectors, and a segment flag. The segment flag indicates which motion vector of the motion vector set was used to find the first best-matching block in the set, from which the segmentation used to create the predictor block is generated.

Figure 6:
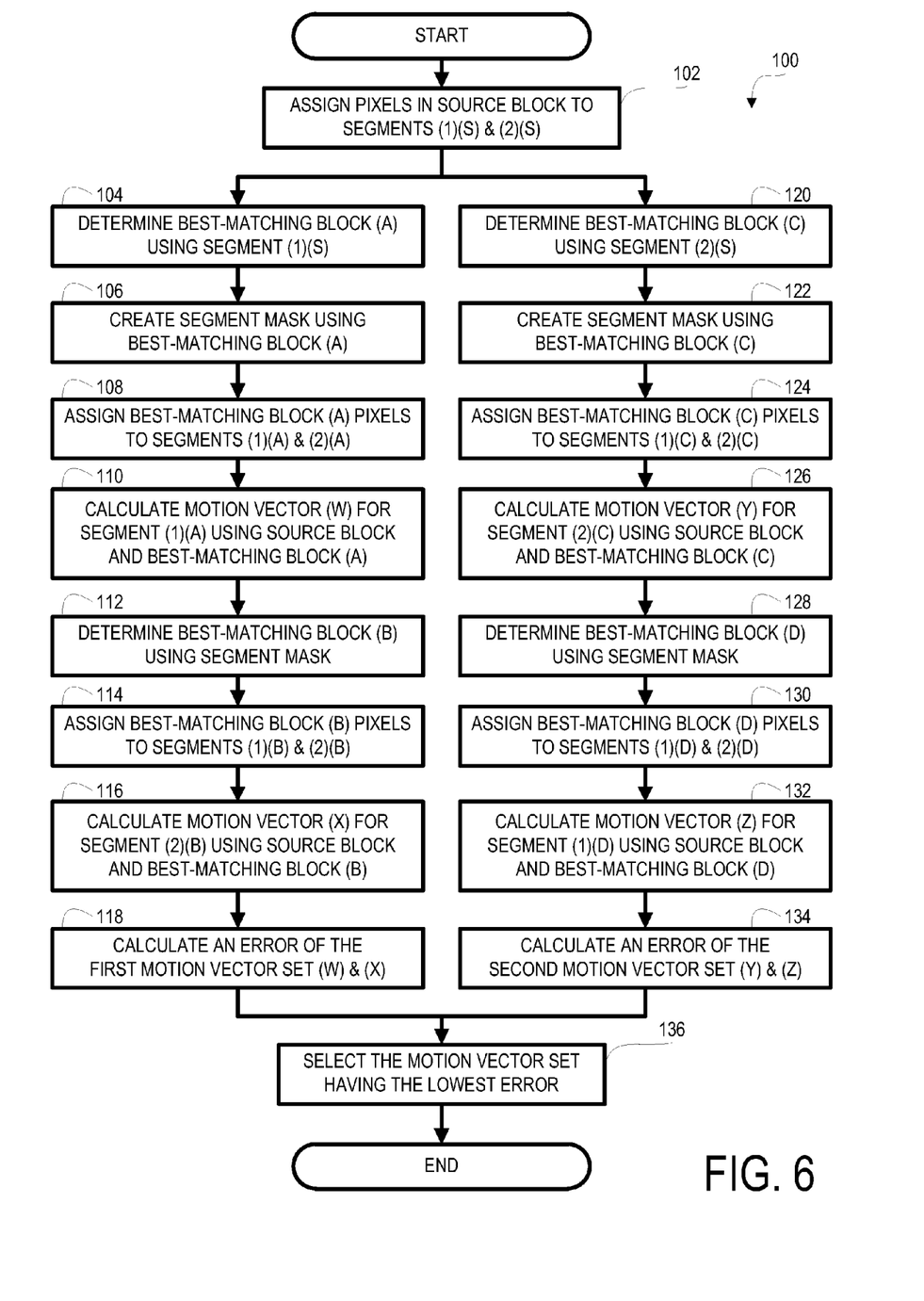
FIG. 6 is a flowchart diagram of a method of determining a motion vector set for the block in the method of FIG. 5.

FIG. 6 is a flowchart diagram of a method 100 of determining a motion vector set. The segments, blocks, and motion vectors described in FIG. 6 include labels that refer to the exemplary schematic of blocks, segments, and motion vectors in FIG. 7. These references are exemplary and are provided for illustrative purposes.

First, the source block (the block to be predicted) is segmented into first (1)(S) and second (2)(S) source segments using a color of pixels defined by the currently selected color segment map (102). Any pixel within the source block that has a color as specified by the color segment map will be included in the first source segment. All other pixels are included in the second source segment.

Once the segmentation is complete, two sequences are performed, starting with stage 104 or stage 110. The sequences may be performed in parallel or sequentially. Alternatively, only one of the sequences may be performed. The first sequence starting with stage 104 finds a first motion vector of the first source segment first, and then finds a second motion vector using a segmentation of the best-matching block of the first source segment. The second sequence starting with stage 110 finds a first motion vector of the second source segment first, and then finds a second motion vector using a segmentation of the best-matching block of the second source segment.

For the first sequence, a first best-matching block (A) is selected based on the pixels in the first source segment (1)(S)

(104). The first best-matching block is typically selected using a motion vector search in a reference frame search window, typically centered on the source block. For example the reference frame search window may extend three blocks above, below, to the left, and to the right of the source block (the origin block for the search window). The reference frame search window may allow for searching in one or more available reference frames. An exemplary method of motion vector searching, including search windows and error calculation is described previously. However, any suitable motion vector search can be used.

For example, in one embodiment, the motion vector search will determine an error for each block searched within the search window based upon the difference between the pixels in the first segment and the corresponding pixels in the searched block. The error may be determined using the mean squared error method or using other methods. Other methods may include using the sum of absolute differences (SAD). The error may alternatively be calculated using other methods, including but not limited to: the sum of absolute transformed differences (SATD) or the sum of squared differences (SSD). The error may be calculated using the same method as the segmentation error or may be different.

The motion vector search will select the first best-matching block using the determined errors. The selected first best-matching block may have the smallest error, though the selected first best-matching block may have an error that is not the smallest depending on how the errors are calculated.

Once the first best-matching block is found for the first source segment, it is segmented using the selected color segment map (106). The segmentation is used to create a segment mask that will be used to define the segments for prediction. The segment mask will have a masked portion corresponding to pixels that match the color defined by the selected color segment map, and will have an unmasked portion corresponding to all other pixels. The segment mask is used to define segment (1)(A) and segment (2)(A) (108). A motion vector (W) is calculated based on the offset in location between the source block to the first best-matching block (110). The motion vector (W) is for the segment (1)(A).

Next, the second best-matching block (B) is determined using the segment mask (112). The unmasked portion of the segment mask will be used to create a third source segment from the source block. As such, the third source segment will be of the same area as segment (2)(A).

The second best-matching block (B) is selected based on the pixels in the third source segment. The second best-matching block will be selected using a motion vector search in a first supplemental reference frame search window. The first supplemental reference frame search window may be the same as the reference frame search window used to find the first best-matching block. Alternatively, the first supplemental reference frame search window may be different, for example, based on the location of the first best-matching block.

Once the second best-matching block (B) is selected, it is segmented using the segment mask (114). Pixels in the second best-matching block are assigned to segments (1)(B) and (2)(B) based on the segment mask created from the first best-matching block (A). A motion vector (X) is calculated from the source block to the second best-matching block (116). This motion vector is for the segment (2)(B).

The final stage of the first sequence is to calculate an error for the best-matching block (A) and best-matching block (B) (118). The error is calculated for the pixels in the segments associated with each best-matching block and the corresponding pixels in the source block.

Now, with respect to the second sequence, a third best-matching block (C) is selected based on the pixels in the second source segment (2)(S) (120). The third best-matching block will typically be selected using a motion vector search in a reference frame search window, such as described previously with respect to stage 104.

Once the third best-matching block is found for the second source segment, it is segmented using the selected color segment map (122). The segmentation is used to create a segment mask that will be used to define the segments for prediction. The segment mask will have a masked portion corresponding to pixels that match the color defined by the selected color segment map, and will have an unmasked portion corresponding to all other pixels. The segment mask is used to define segment (1)(C) and segment (2)(C) (124). Segment (1)(C) corresponds to the masked portion of the segment mask and segment (2)(C) corresponds to the unmasked portion. A motion vector (Y) is calculated based on the offset in location between the source block to the third best-matching block (126). The motion vector (Y) is for the segment (2)(C).

Next, the fourth best-matching block (D) is determined using the segment mask (128). The masked portion of the segment mask will be used to create a fourth source segment from the source block. As such, the fourth source segment will be of the same area as segment (1)(C).

The fourth best-matching block (D) is selected based on the pixels in the fourth source segment. The fourth best-matching block will be selected using a motion vector search in a second supplemental reference frame search window. The second supplemental reference frame search window may be the same as the reference frame search window used to find the third best-matching block. Alternatively, the second supplemental reference frame search window may be different, for example, based on the location of the third best-matching block.

Once the fourth best-matching block (D) is selected, it is segmented using the segment mask (130). Pixels in the fourth best-matching block are assigned to segments (1)(D) and (2)(D) based on the segment mask created from the third best-matching block (C). A motion vector (Z) is calculated from the source block to the fourth best-matching block (132). This motion vector is for the segment (1)(D).

The final stage of the second sequence is to calculate an error for motion vector (Y) and motion vector (Z) (134). The error is calculated for the pixels in the segments associated with each motion vector and the corresponding pixels in the source block.

Once the error for each motion vector set is calculated, a motion vector set is selected based on the errors (136). The selected motion vector set may have the smallest error. Alternatively, the selected motion vector set may have an error that is not the smallest, but may be considered to be the best error based upon other considerations. This selected best motion vector set is one of those used to find the motion vector set for the block being predicted, and is the output of stage 88 of FIG. 5.

Figure 7:
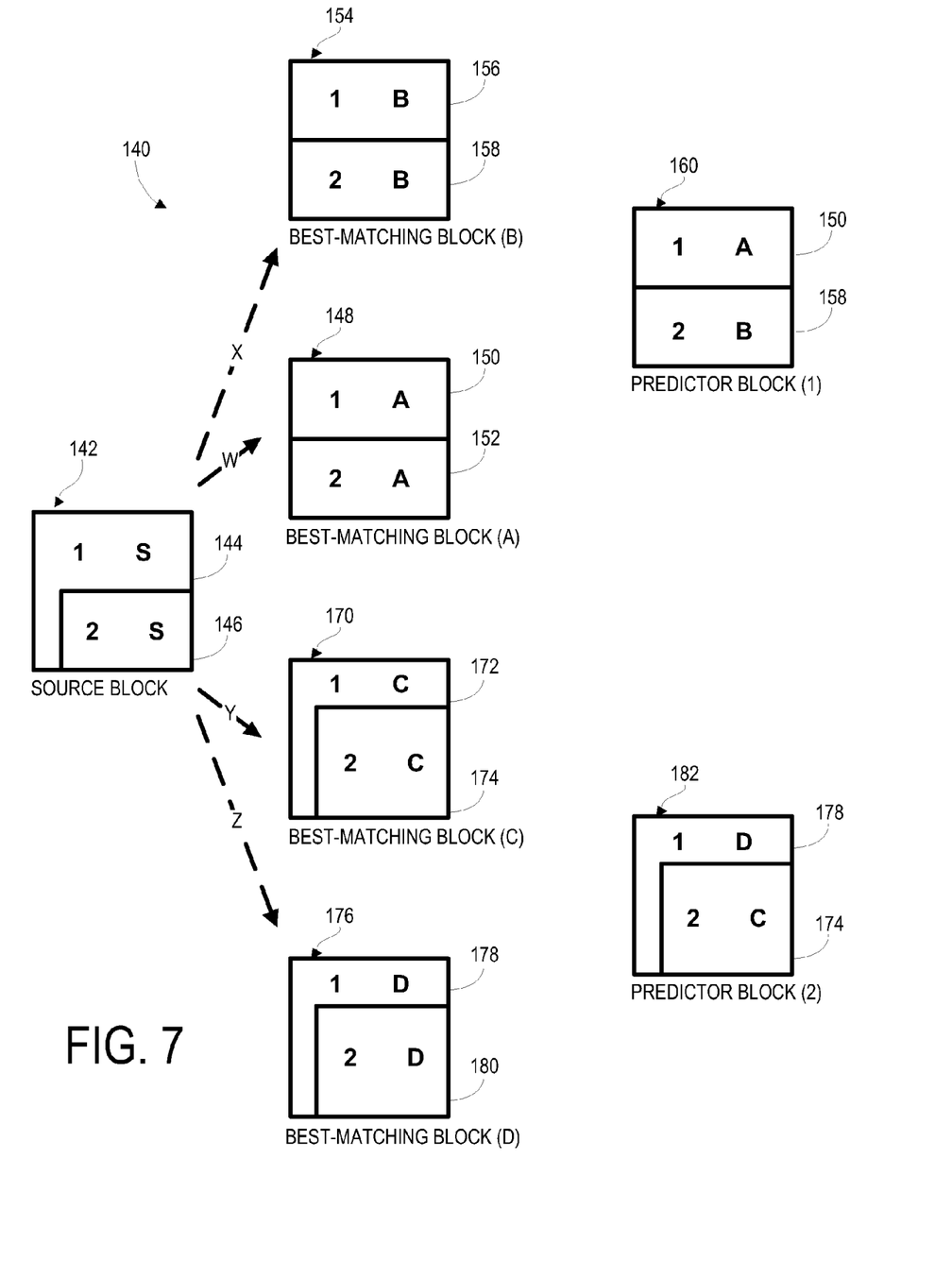
FIG. 7 is a schematic diagram of an exemplary application of the method of FIG. 6.

FIG. 7 is a schematic diagram 140 of an exemplary application of the method of FIG. 6. Diagram 140 includes exemplary blocks, segments, and motion vectors illustrative of the application of the method 100 of FIG. 6. While the exemplary segments shown herein are contiguous areas for the purposes of explanation, in practice, segments can be a group of any number of pixels in a block, including those that are not contiguous.

A source block 142 is provided that is segmented into source segment (1)(S) 144 and source segment (2)(S) 146. Source segment (1)(S) 144 includes pixels in the source block 142 having color(s) included in a selected color segment map, whereas source segment (2)(S) 146 includes all other pixels in the source block 142. The source segments are used to search and locate the best-matching block (A) 148 and best-matching block (C) 170. The best-matching blocks will preferably include pixels that are closest in value and configuration to the source segment being searched.

First, with respect to the first sequence of method 100, the best-matching block (A) 148 is found using the source segment (1)(S) 144. Best-matching block (A) 148 is defined by a motion vector (W). Best-matching block (A) 148 is found in and motion vector (W) is directed to a reference frame that can be the same as frame of the source block or any other available reference frame. The best-matching block (A) is segmented into segment (1)(A) 150 and segment (2)(A) 152. These segments are created using the color segment map as applied to the best-matching block (A). The segmentation of the best-matching block (A) 148 is used to find the best-matching block (B) 154 and also used to create the predictor block (1) 160.

The resulting segments of best-matching block (A) 148 may be different than the source segments of the source block 142, as is shown. But alternatively, for example, if the best-matching block (A) 148 has the same pixels as the source block 142, the best-matching block (A) 148 segments may be the same as the source block 142.

A segment mask can be defined based on the area included in segment (1)(A) 150 and segment (2)(A) 152. In this case, the masked portion of the segment mask would cover the area of segment (1)(A) 150 and the unmasked portion would cover the area of segment (2)(A) 152. The segment mask can be used to create another, third source segment from the source block (not shown). The third source segment would include the area defined by the unmasked portion of the segment mask (i.e. the area covered by segment (2)(A) 152). The third source segment can be used to find the best-matching block (B) 154. The best-matching block (B) 154 can be found by a motion vector search in any number of available reference frames, and is defined by a motion vector (X). The best-matching block (B) 154 is segmented into segment (1)(B) 156 and segment (2)(B) 158 by, for example, using the segment mask. As such, the segments of best-matching block (A) 148 and best-matching block (B) 154 are the same with respect to the area that they cover.

The segments of best-matching block (A) 148 and best-matching block (B) 154 can be used to create a predictor block (1) 160 that can be used to predict and encode the source block 142. The predictor block (1) 160 can be constructed by combining the segment (1)(A) 150 from the best-matching block (A) 148 and the segment (2)(B) 158 from the best-matching block (B) 154.

Next, with respect to the second sequence of method 100, the best-matching block (C) 170 is found using the source segment (2)(S) 146. Best-matching block (C) 170 is defined by a motion vector (Y). Best-matching block (C) 170 is found in and motion vector (Y) is directed to a reference frame that can be the same as frame of the source block or any other available reference frame. The best-matching block (C) 170 is segmented into segment (1)(C) 172 and segment (2)(C) 174. These segments are created using the color segment map as applied to the best-matching block (C) 170. The segmentation of the best-matching block (C) 170 is used to find the best-matching block (D) 176 and also used to create the predictor block (2) 182.

The resulting segments of best-matching block (C) 170 may be different than the source segments of the source block 142, as is shown. But alternatively, for example, if the best-matching block (C) 170 has the same pixels as the source block 142, the best-matching block (C) 170 segments may be the same as the source block 142.

A segment mask can be defined based on the area included in segment (1)(C) 172 and segment (2)(C) 174. In this case, the masked portion of the segment mask would cover the area of segment (1)(C) 172 and the unmasked portion would cover the area of segment (2)(C) 174. The segment mask can be used to create another, fourth source segment from the source block (not shown). The fourth source segment would include the area defined by the masked portion of the segment mask (i.e. the area covered by segment (1)(C) 172). The fourth source segment can be used to find the best-matching block (D) 176. The best-matching block (D) 176 can be found by a motion vector search in any number of available reference frames, and is defined by a motion vector (Z). The best-matching block (D) 176 is segmented into segment (1)(D) 178 and segment (2)(D) 180 by, for example, using the segment mask. As such, the segments of best-matching block (C) 170 and best-matching block (D) 176 are the same with respect to the area that they cover.

The segments of best-matching block (C) 170 and best-matching block (D) 176 can be used to create a predictor block (2) 182 that can be used to predict and encode the source block 142. The predictor block (2) 182 can be constructed by combining the segment (2)(C) 174 from the best-matching block (C) 170 and the segment (1)(D) 178 from the best-matching block (D) 176.

Figure 8:
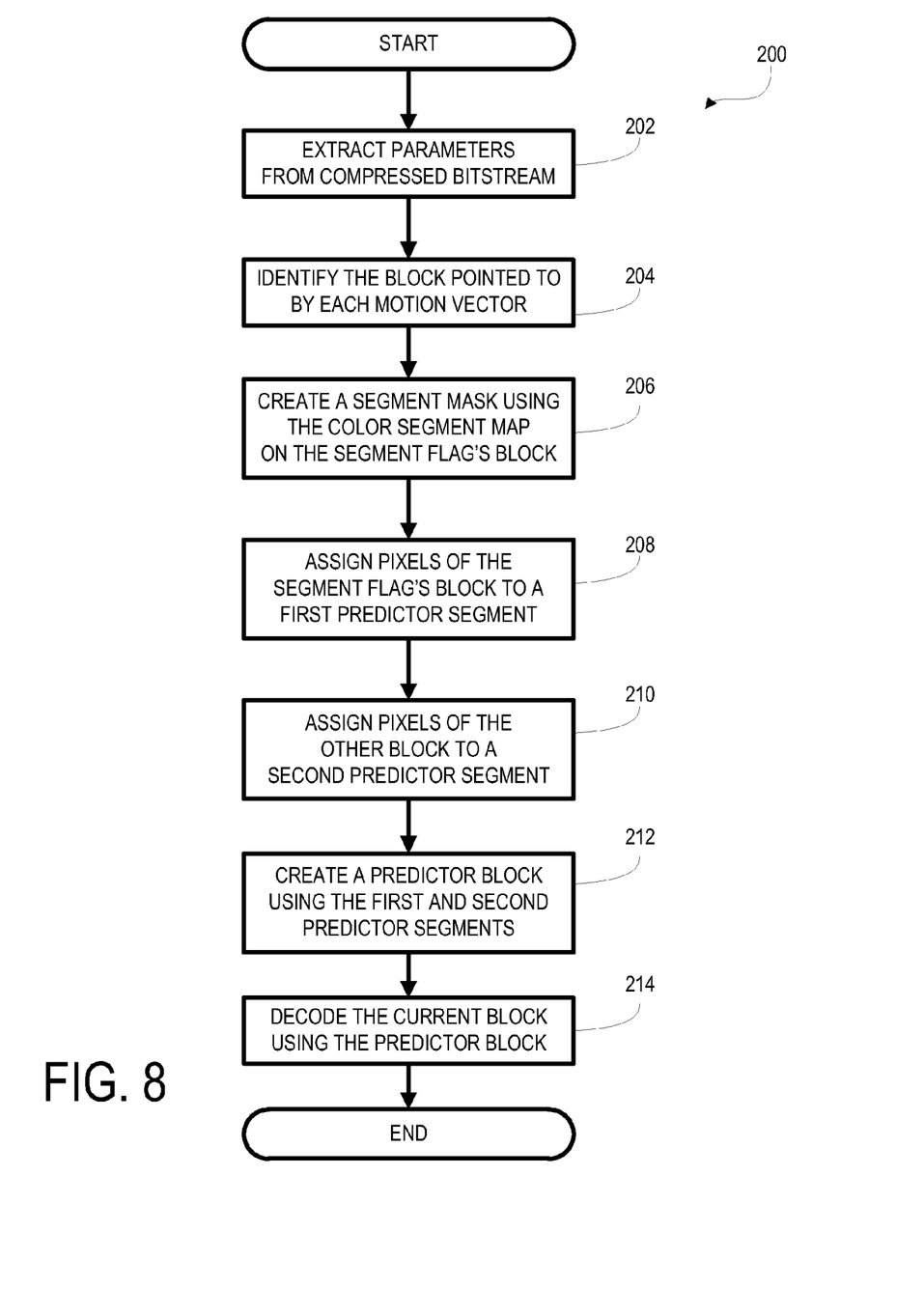
FIG. 8 is a flowchart diagram of a method of decoding a block using color segmentation in the video decompression system of FIG. 3.

FIG. 8 is a flowchart diagram of a method 200 of decoding a block using color segmentation in the video decompression system of FIG. 3. The parameters to decode the block are extracted from the compressed bitstream (202). The parameters include a residual block, a set of motion vectors, a color segment map, and a segment flag. A first block and a second block are identified, each block being associated with one motion vector in the motion vector set (204).

The segment flag will identify which block to use to create the segmentation for creating the predictor block. The decoder will create a segment mask using the color segment map on that identified block (206). Each motion vector is also associated with either the masked or the unmasked portion of the segment mask. Based on this association, a first predictor segment is created by assigning pixels from the identified block corresponding with one of the masked or unmasked portion of the segment mask (208). Next, a second predictor segment is created by assigning pixels from the other block corresponding with the other one of the masked or unmasked portion of the segment mask (210).

The predictor block is created using the first predictor segment and the second predictor segment (212). The predictor block is used to reconstruct the residual block to decode the encoded block (214).

The operation of encoding can be performed in many different ways and can produce a variety of encoded data formats. The above-described embodiments of encoding or decoding may illustrate some exemplary encoding techniques. However, in general, encoding and decoding are understood to include any transformation or any other change of data whatsoever.

The embodiments of encoder 20 and/or decoder 42 (and the algorithms, methods, instructions etc. stored thereon and/or executed thereby) are implemented in whole or in part by one or more processors which can include computers, servers, or any other computing device or system capable of manipulating or processing information now-existing or hereafter developed including optical processors, quantum processors and/or molecular processors. Suitable processors also include, for example, general purpose processors, special purpose processors, IP cores, ASICS, programmable logic arrays, programmable logic controllers, microcode, firmware, microcontrollers, microprocessors, digital signal processors, memory, or any combination of the foregoing. In the claims, the term "processor" should be understood as including any the foregoing, either singly or in combination. The terms "signal" and "data" are used interchangeably.

Further, portions of encoder 20 and/or decoder 42 do not necessarily have to be implemented in the same manner. Thus, for example, intra/inter prediction stage 26 can be implemented in software whereas transform stage 28 can be implemented in hardware.

Encoder 20 and/or decoder 42 can be implemented in whole or in part by one or more computers, servers, processors or any other suitable computing devices or systems that can carry out any of the embodiments described herein. In one embodiment, for example, encoder 20 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms and/or instructions described herein.

Further, all or a portion of embodiments of the present invention can take the form of a computer program product accessible from, for example, a computer-usable or computer-readable medium. A computer-usable or computer-readable medium can be any device that can, for example contain, store, communicate, and/or transport the program for use by or in connection with any computing system or device. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video signal having a plurality of frames with at least one frame with a plurality of blocks having pixels, the method comprising:

identifying a first color of pixels using a processor;

assigning pixels in a source block in the at least one frame having the first color to a first source segment and assigning pixels in the source block having a color different than the first color to a second source segment; and determining a set of motion vectors derived from the first source segment, wherein determining the set of motion vectors derived from the first source segment includes:

determining a plurality of errors between the first source segment in the source block and a corresponding plurality of blocks in a reference frame search window, selecting from among the corresponding plurality of blocks in the reference frame search window a first best-matching block based on the determined plurality of errors between the first source segment and the corresponding plurality of blocks in the reference frame search window, selecting a first motion vector of the set of motion vectors for the first source segment using the source block and the first best-matching block, assigning pixels in the first best-matching block having the first color to a masked portion of a first segment mask and assigning pixels in the first best-matching block having a color different than the first color to an unmasked portion of the first segment mask, assigning pixels in the source block within the unmasked portion of the first segment mask to a third source segment, determining a plurality of errors between the third source segment and a corresponding plurality of blocks in a first supplemental reference frame search window, selecting from among the corresponding plurality of blocks in the first supplemental reference frame search window a second best-matching block based on the determined plurality of errors between the third source segment and the corresponding plurality of blocks in the first supplemental reference frame search window, and selecting a second motion vector of the set of motion vectors for the first source segment using the source block and the second best-matching block; and determining a set of motion vectors derived from the second source segment, wherein determining the set of motion vectors derived from the second source segment includes:

determining a plurality of errors between the second source segment in the source block and a corresponding plurality of blocks in the reference frame search window, selecting from among the corresponding plurality of blocks in the reference frame search window a third best-matching block based on the determined plurality of errors between the second source segment and the corresponding plurality of blocks in the reference frame search window, selecting a first motion vector of the set of motion vectors for the second source segment using the source block and the third best-matching block, assigning pixels in the third best-matching block having the first color to a masked portion of a second segment mask and assigning pixels in the third best-matching block having a color different than the first color to an unmasked portion of the second segment mask, assigning pixels in the source block within the masked portion of the second segment mask to a fourth source segment, determining a plurality of errors between the fourth source segment and a corresponding plurality of blocks in a second supplemental reference frame search window, selecting from among the corresponding plurality of blocks in the second supplemental reference frame search window a fourth best-matching block based on the determined plurality of errors between the fourth source segment and the corresponding plurality of blocks in the second supplemental reference frame search window, and selecting a second motion vector of the set of motion vectors for the second source segment using the source block and the fourth best-matching block.

2. The method of claim 1, further comprising:
  determining a first error to encode the source block using the set of motion vectors derived from the first source segment;
  determining a second error to encode the source block using the set of motion vectors derived from the second source segment; and
  selecting one of the set of motion vectors derived from the first source segment or the set of motion vectors derived from the second source segment based on the determined first and second errors.

3. The method of claim 2, further comprising:
  encoding the source block using the selected set of motion vectors.

4. The method of claim 3, wherein encoding the source block using the selected set of motion vectors comprises:
  encoding the source block by including the following parameters:
    a residual block created using the selected set of motion vectors;
    a color segment map based on the first color of pixels;
    the selected set of motion vectors; and
    a segment flag.

5. The method of claim 1, wherein the first color includes a first color value and other color values within a predetermined threshold of the first color value.

6. The method of claim 1, further comprising:
  assigning pixels in the first best-matching block within the masked portion of the first segment mask to a first predictor segment;
  assigning pixels in the second best-matching block within the unmasked portion of the first segment mask to a second predictor segment;
  creating a first predictor block using the first predictor segment and the second predictor segment; and
  encoding the source block using the first predictor block.

7. The method of claim 1, further comprising:
  assigning pixels in the third best-matching block within the unmasked portion of the second segment mask to a third predictor segment;
  assigning pixels in the fourth best-matching block within the masked portion of the second segment mask to a fourth predictor segment;
  creating a second predictor block using the third predictor segment and the fourth predictor segment; and
  encoding the source block using the second predictor block.

* * * * *